(12) United States Patent
He et al.

(10) Patent No.: US 11,784,552 B2
(45) Date of Patent: *Oct. 10, 2023

(54) POWER CONVERTER AND RELATED SYSTEM

(71) Applicant: Huawei Digital Power Technologies Co., Ltd., Shenzhen (CN)

(72) Inventors: Zhengyan He, Nuremberg (DE); Jiebin Cheng, Dongguan (CN); Qinghai Wang, Shenzhen (CN); Yuliang Lu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,821

(22) Filed: Jul. 6, 2022

(65) Prior Publication Data

US 2022/0337145 A1 Oct. 20, 2022

Related U.S. Application Data

(63) Continuation of application No. 17/112,571, filed on Dec. 4, 2020, now Pat. No. 11,437,904, which is a (Continued)

(30) Foreign Application Priority Data

Jun. 5, 2018 (CN) .......................... 201810583615.X

(51) Int. Cl.
*H02M 1/00* (2006.01)
*H02M 3/156* (2006.01)
(Continued)

(52) U.S. Cl.
CPC ........... *H02M 1/0051* (2021.05); *H02M 1/00* (2013.01); *H02M 3/156* (2013.01); *H02M 3/24* (2013.01); *H04W 88/08* (2013.01)

(58) Field of Classification Search
CPC .. H02M 3/1582; H02M 3/158; H02M 1/0058; H02M 3/33592; H02M 1/007;
(Continued)

(56) References Cited

U.S. PATENT DOCUMENTS 5,477,131 A 12/1995 Gegner
6,051,963 A 4/2000 Eagar
(Continued)

FOREIGN PATENT DOCUMENTS

CN 1352486 A 6/2002
CN 1352487 A 6/2002
(Continued)

OTHER PUBLICATIONS

U.S. Appl. No. 17/112,571, filed Dec. 4, 2020.

*Primary Examiner* — Golam Sorowar
(74) *Attorney, Agent, or Firm* — Leydig, Voit & Mayer, Ltd.

(57) ABSTRACT

Embodiments of the present disclosure disclose a power converter and a related system. The power converter includes a controller and a power conversion circuit. The power conversion circuit is configured to convert an input power of an input power supply into an output power of a load, where the input power supply is an external power supply connected to the power converter. The controller is configured to control on/off of the first switch element, to implement connection/disconnection between the input power supply and the inductive element; and control the unidirectional conduction circuit to be turned on before the first switch element is turned on in the power conversion cycle.

14 Claims, 12 Drawing Sheets

Related U.S. Application Data continuation of application No. PCT/CN2019/089982, filed on Jun. 4, 2019.

(51) Int. Cl.
  *H02M 3/24* (2006.01)
  *H04W 88/08* (2009.01)

(58) Field of Classification Search
  CPC .... H02M 1/34; H02M 3/33584; H02M 5/225; H02M 5/275; H02M 5/458; H02M 7/4807; H02M 7/4815; H02M 7/797; H02M 1/14; H02M 1/083; H02M 3/156; H02M 3/335; H02M 3/33507; H02M 1/0054; H02M 3/33569; H02M 1/0009; H02M 1/0048; H02M 1/44; H02M 3/33576; H02M 3/337; H02M 1/342; H02M 1/42; H02M 3/157; H02M 7/2195; H02M 7/5387; H02M 1/0006; H02M 1/346; H02M 1/4225; H02M 3/33546; H02M 7/537; H02M 7/72; H02M 1/0064; H02M 1/15; H02M 1/348; H02M 1/36

See application file for complete search history.

(56) References Cited

U.S. PATENT DOCUMENTS

| | | | | |
|---|---|---|---|---|
| 8,669,744 | B1 * | 3/2014 | Vinciarelli | H02M 3/1582 |
| | | | | 323/235 |
| 9,705,411 | B2 * | 7/2017 | Jang | H02M 3/1582 |
| 9,787,179 | B1 * | 10/2017 | Clarkin | H02M 3/158 |
| 2005/0265055 | A1 | 12/2005 | Chang | |
| 2008/0291711 | A1 | 11/2008 | Williams | |
| 2020/0244175 | A1 * | 7/2020 | Mahdavikhah-Mehrabad | |
| | | | | H02M 3/335 |

FOREIGN PATENT DOCUMENTS

| | | | |
|---|---|---|---|
| CN | 1956304 | A | 5/2007 |
| CN | 101755380 | A | 6/2010 |
| CN | 101783588 | A | 7/2010 |
| CN | 201563061 | U | 8/2010 |
| CN | 202059323 | U | 11/2011 |
| CN | 102723869 | A | 10/2012 |
| CN | 103683921 | A | 3/2014 |
| CN | 105144562 | A | 12/2015 |
| CN | 105871202 | A | 8/2016 |
| CN | 107910892 | A | 4/2018 |
| CN | 108900083 | A | 11/2018 |
| JP | S558249 | A | 1/1980 |
| JP | H07203681 | A | 8/1995 |

* cited by examiner

POWER CONVERTER AND RELATED SYSTEM

CROSS-REFERENCE TO RELATED APPLICATIONS

This application is a continuation of U.S. patent application Ser. No. 17/112,571, filed on Dec. 4, 2020, which is a continuation of International Application No. PCT/CN2019/089982, filed on Jun. 4, 2019. The International Application claims priority to Chinese Patent Application No. 201810583615.X, filed on Jun. 5, 2018. All of the aforementioned patent applications are hereby incorporated by reference in their entireties.

TECHNICAL FIELD

The present disclosure relates to the field of electronic circuits, and in particular, to a power converter and a related system.

BACKGROUND

In a communication direct current power supply system, a DC-C (direct current-common) power distribution system is used for power distribution. In view of cost reduction and design complexity reduction, a buck-boost topology is often used in the DC-C power distribution system currently to implement a direct current power supply function. FIG. 1 shows a buck-boost topology. A working principle of the topology is as follows: When Q1 is turned on, an input voltage Vin of a power supply enables an inductor L to store energy. When Q1 is turned off, the inductor L releases energy through a diode D1, and provides an output voltage Vout for a load. This is repeated to implement conversion from the input voltage Vin to the output voltage Vout. However, it is found in practice that, at a moment Q1 is turned on, the diode D1 withstands a voltage of Vin+Vout. During reverse recovery of D1, the voltage is directly applied to Q1 for heat dissipation and elimination. This causes a relatively large reverse recovery loss.

To resolve the problem of large reverse recovery loss, the prior art provides a buck-boost topology circuit working in three modes as follows: A first mode is an intermittent mode. FIG. 2A is a schematic current diagram of the inductor L in the intermittent mode. As shown in FIG. 2A, in the intermittent mode, a current of the inductor L is reduced to 0 A before a power conversion cycle T ends, so that the diode D1 can complete the reverse recovery before Q1 is turned on, thereby avoiding a reverse recovery loss at a high voltage. The power conversion cycle T may also be referred to as a voltage conversion cycle, and refers to duration from a time point at which the inductor starts to store electric energy when Q1 is turned on, to a time point at which the inductor releases the electric energy when Q1 is turned off, to a next time point at which Q1 is turned on, that is, duration between two adjacent time points at which Q1 is turned on.

A second mode is a critical mode. FIG. 2B is a schematic current diagram of the inductor L in the critical mode. As shown in FIG. 2B, in the critical mode, the current of the inductor L is exactly reduced to 0 A when the power conversion cycle T ends, so that the diode D1 can also complete the reverse recovery before Q1 is turned on, thereby avoiding a reverse recovery loss at a high voltage.

A third mode is a continuous mode in which a minimum current exceeds 0 (a minimum current is greater than 0 A). Specifically, in this embodiment, the diode D1 is replaced with a field effect transistor, to achieve a synchronous rectification effect, and a current (that is, a reverse current) less than 0 can be obtained. FIG. 2C is a schematic current diagram of the inductor L in the continuous mode. As shown in FIG. 2C, in the continuous mode, the current of the inductor L is reduced to less than 0 A before the power conversion cycle T ends, so that D1 can directly complete the reverse recovery by using the reverse current, thereby avoiding a reverse recovery loss at a high voltage.

However, it is found in practice that, a same disadvantage exists in the three modes: When the load is relatively large, an average value of the current of the inductor is relatively large, it is very difficult for the current of the inductor to exceed 0, and a maximum value of the current of the inductor needs to reach at least twice of the average value. In addition, in a process of making the current of the inductor exceed 0, a great copper loss and a great magnetic loss are caused to the inductor. Therefore, the inductor is easily damaged. Moreover, a great turn-off loss is caused to Q1. Based on the foregoing analysis, the three modes are relatively suitable for low power conversion. When an output power (or a voltage) that needs to be converted is relatively large, an inductance loss and a turn-off loss caused in using each of the three modes greatly exceed the reverse recovery loss of D1. Therefore, in the prior art, a problem of a relatively large reverse recovery loss of a diode D1 still exists.

SUMMARY

Embodiments of the present disclosure disclose a power conversion circuit and a related system, to resolve a problem of a relatively large reverse recovery loss of a diode in the prior art.

According to a first aspect, an embodiment of the present disclosure discloses a power converter, including a controller and a power conversion circuit, where the power conversion circuit is configured to convert an input power provided by an input power supply for the power converter into an output power of a load, the input power supply is an external power supply connected to the power converter, and the load is an output load connected to the power converter;

the power conversion circuit includes an inductive element, a first switch element, a first diode, and a unidirectional conduction circuit, where the inductive element is separately connected to the first switch element and the first diode, the unidirectional conduction circuit is connected in parallel to the inductive element, the controller is separately connected to the first switch element and the unidirectional conduction circuit, and the input power supply is connected to the inductive element through the first switch element;

the controller is configured to control on/off of the first switch element, to implement connection/disconnection between the input power supply and the inductive element, and convert, by using the inductive element, the input power provided by the input power supply for the power converter into the output power of the load; and the controller is further configured to control the unidirectional conduction circuit to be turned on before the first switch element is turned on in a power conversion cycle, so that a closed loop is formed between the unidirectional conduction circuit and the inductive element, to complete reverse recovery of the first diode before the first switch element is turned on, and reduce a reverse recovery loss of the first diode, where the power conversion cycle is duration between two adjacent time points at which the first switch element is turned off or duration between two adjacent time points at which the first switch element is turned on.

In some embodiments, the controller is further configured to control the unidirectional conduction circuit to be turned off after the first switch element is turned on in the power conversion cycle and before the first switch element is turned off in the power conversion cycle, so that the inductive element converts an input power of the input power supply into the output power of the load without having the input power consumed by the unidirectional conduction circuit.

In some embodiments, the power conversion circuit is a buck-boost topology circuit; and the controller is further configured to: when an input voltage of the input power supply is greater than or equal to a first voltage, control the first switch element to be turned off, and turn on the unidirectional conduction circuit, so that a closed loop is formed between the unidirectional conduction circuit and the inductive element, an end voltage is reduced, and a voltage withstand capability of the power conversion circuit is improved, where the end voltage is a voltage at two ends of the switch element, and/or a voltage at two ends of the first diode.

In some embodiments, the unidirectional conduction circuit is connected in parallel or magnetically coupled to the inductive element.

In some embodiments, the controller is further configured to control the unidirectional conduction circuit to be a low impedance circuit, to turn on the unidirectional conduction circuit; or control the unidirectional conduction circuit to be a high impedance circuit, to turn off the unidirectional conduction circuit.

In some embodiments, the unidirectional conduction circuit supports forward current conduction and reverse current cutoff, where the forward current is a current generated by the inductive element under excitation of the input power supply, and the reverse current is a current in a direction opposite to a direction of the forward current.

In some embodiments, the power conversion circuit supports working in a continuous mode, and a minimum current flowing through the inductive element is greater than 0.

In some embodiments, the unidirectional conduction circuit includes a second switch element and a second diode connected to each other; and the controller is configured to control on/off of the second switch element, to correspondingly control the unidirectional conduction circuit to be turned off or turned on.

In some embodiments, the second switch element includes any one of the following: a switch, a triode, a field effect transistor, a relay, and a diode.

In some embodiments, the power conversion circuit includes any one of the following: a buck buck topology circuit, a boost boost topology circuit, a buck-boost topology circuit, a forward topology circuit, a flyback topology circuit, an isolated topology circuit, and a non-isolated topology circuit.

In some embodiments, the first switch element includes any one of the following: a switch, a triode, a field effect transistor, a relay, and a diode.

According to a second aspect, an embodiment of the present disclosure provides a communications system (which may be specifically a communication direct current power supply system), including a radio remote unit RRU and a power converter supplying power to the RRU, where the power converter is the power converter described above in the first aspect.

The embodiments of the present disclosure can be implemented to resolve a problem of a relatively large reverse recovery loss of a diode in the prior art.

BRIEF DESCRIPTION OF DRAWINGS

To describe the technical solutions in the embodiments of the present disclosure or in the prior art more clearly, the following briefly describes the accompanying drawings required for describing the embodiments or the prior art.

DESCRIPTION OF EMBODIMENTS

The following describes the technical solutions in the embodiments of the present disclosure in detail with reference to the accompanying drawings in the present disclosure.

Figure 1:
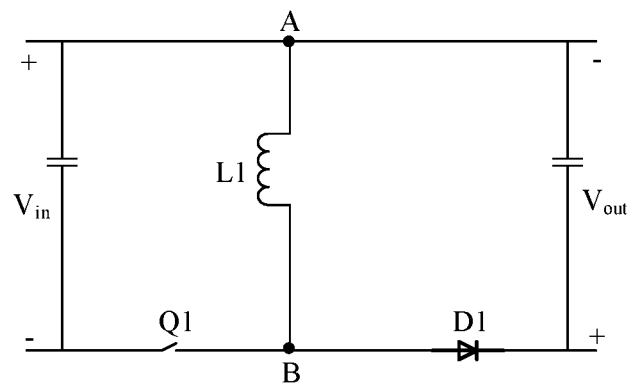
FIG. 1 is a schematic diagram of a buck-boost topology circuit provided in the prior art.
Figure 2A:
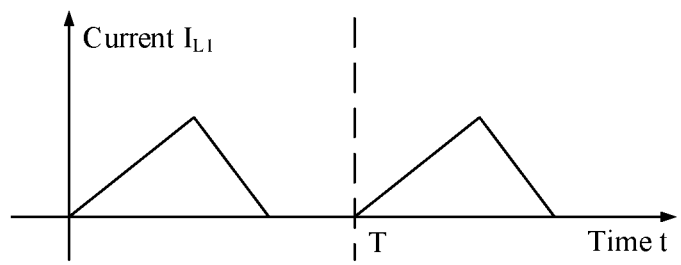
FIG. 2A to FIG. 2C are several schematic current diagrams of an inductor provided in the prior art.
Figure 2B:
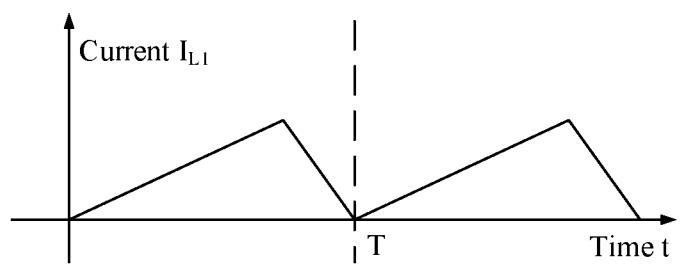
Figure 2C:
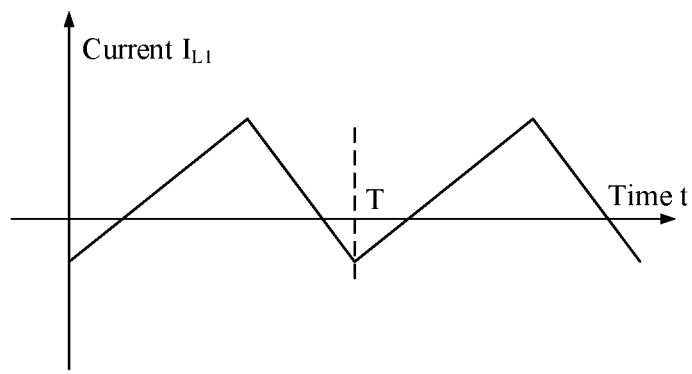

It is further found by the applicant in filing this application that: when a buck-boost topology circuit is used to achieve direct current power supply, for example, in the buck-boost topology circuit shown in FIG. 1, when a lightning strike occurs, the input voltage Vin of the power supply is instantly hit to a very high voltage. In this case, a voltage withstood by two ends of Q1 and D1 in the circuit is Vin+Vout, easily causing damage to elements (which may be specifically Q1 and D1) of the circuit. To prevent the elements of the circuit from being damaged, a relatively high requirement is imposed on selection of the elements of the circuit, especially, the elements Q1 and D1. This undoubtedly increases circuit design costs.

Therefore, in the prior art, there exists a problem such as a large reverse recovery loss of a diode D1, a relatively high requirement on an element of a circuit, or damage to an element of a circuit caused by a relatively weak voltage withstand capability of the element when a lightning strike occurs.

Figure 3A:
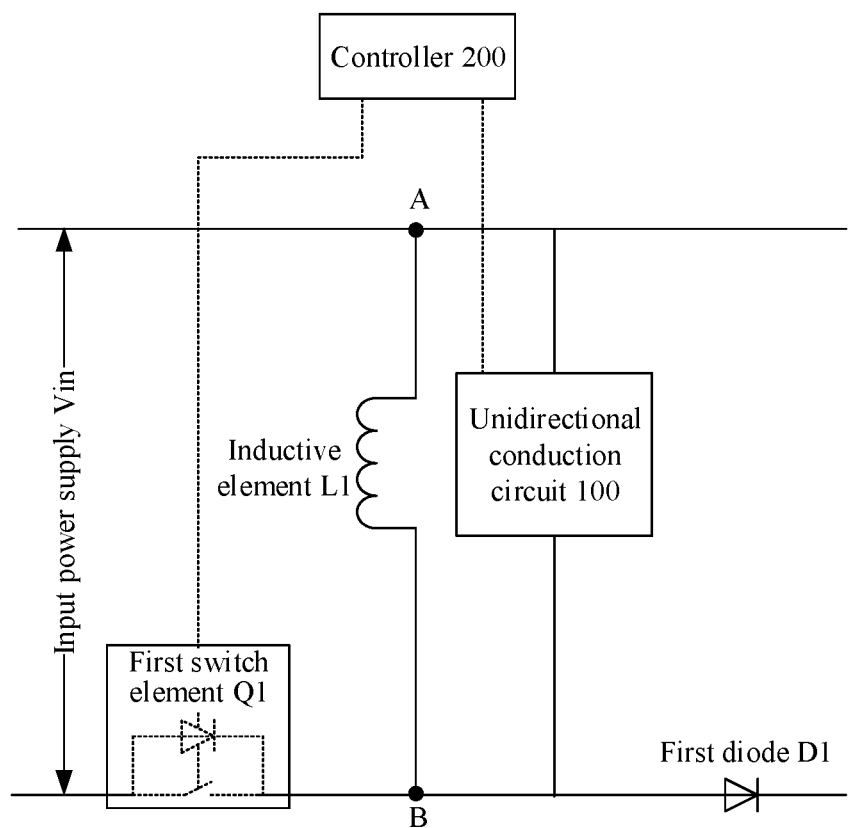
FIG. 3A is a schematic diagram of a power converter according to an embodiment of the present disclosure.

To resolve the foregoing problem, this application provides a power converter and a related system. Referring to FIG. 3A, the following first describes a power converter provided in this application. A power converter 300 shown in FIG. 3A includes a controller 200 and a power conversion circuit. The power conversion circuit includes an inductive element L1, a first switch element Q1, a first diode D1, and a unidirectional conduction circuit 100. Any two elements of the inductive element L1, the first switch element Q1, and the first diode D1 are electrically connected. Using the inductive element L1 as an example, the inductive element L1 may be separately electrically connected to the first switch element Q1 and the first diode D1. The unidirectional conduction circuit 100 is connected in parallel to two ends of the inductive element L1. The controller 200 is separately connected to the first switch element Q1 and the unidirectional conduction circuit 100. The power conversion circuit is configured to convert an input power provided by an input power supply for the power converter 300 into an output power of a load. The input power supply is an external power supply connected to the power converter, and the load is an output load connected to the power converter. The input power supply is connected to the inductive element L1 through the first switch element Q1.

the controller 200 is configured to control on/off of the first switch element Q1, to implement connection/disconnection between the input power supply and the inductive element L1, and convert, by using the inductive element L1, the input power provided by the input power supply for the power converter 300 into the output power of the load; and the inductive element L1 is configured to convert the input power provided by the input power supply for the power converter and transfer the input power to the load in a preset power conversion cycle, where the power conversion cycle is duration between two adjacent time points at which the first switch element is turned off or duration between two adjacent time points at which the first switch element is turned on; and the controller 200 is further configured to control the unidirectional conduction circuit 100 to be turned on before the first switch element Q1 is turned on in a preset power conversion cycle, so that a closed loop is formed between the unidirectional conduction circuit 100 and the inductive element L1, to complete reverse recovery of the first diode D1 before the first switch element Q1 is turned on, and reduce a reverse recovery loss of the first diode D1.

For example, the controller 200 controls the unidirectional conduction circuit 100 to be turned on before the first switch element Q1 is turned on in the power conversion cycle. In this case, the closed loop is formed between the inductive element L1 and the unidirectional conduction circuit 100, so that the reverse recovery of the first diode is completed before Q1 is turned on, and a reverse recovery voltage at two ends of the first diode is reduced, thereby reducing the reverse recovery loss of the first diode.

The power conversion cycle may refer to a time difference from a time point at which the first switch element Q1 is turned on and the inductive element L1 is charged to store energy, to a time point at which the first switch element Q1 is turned off and the inductor L1 serves as a power supply for releasing energy, to a next time point at which Q1 is turned on again, that is, a time difference between two adjacent time points at which the first switch element Q1 is turned on, or a time difference between two adjacent time points at which the first switch element Q1 is turned off.

In some embodiments, the controller 200 is further configured to control the unidirectional conduction circuit 100 to be turned off within target duration, so that the inductive element L1 converts the input power of the input power supply and transfers the input power of the input power supply to the load without using the unidirectional conduction circuit, to avoid a power loss of the unidirectional conduction circuit. The target duration is preset duration from a time point at which the first switch element Q1 is turned on in the power conversion cycle to a time point at which the first switch element is turned off in the power conversion cycle. The preset duration is greater than equal to 0. That is, at any moment after the first switch element Q1 is turned on in the power conversion cycle and before the first switch element Q1 is turned off in the power conversion cycle, the controller 200 may control the unidirectional conduction circuit 100 to be turned off, so that the inductive element L1 converts the input power (or an input voltage) of the input power supply into the output power (or an output voltage) of the load without having the input power consumed by the unidirectional conduction circuit 100.

In some embodiments, when a lightning strike occurs and the input voltage provided by the input power supply for the power converter 300 is greater than or equal to a first voltage, the controller controls the first switch element Q1 to be turned off and controls the unidirectional conduction circuit 100 to be turned on, so that the closed loop is formed between the inductive element L1 and the unidirectional conduction circuit 100, to reduce an end voltage and improve a voltage withstand capability of the power conversion circuit (which may be specifically the elements in the circuit, for example, Q1 and D1). The end voltage may be a voltage at two ends of the first switch element Q1, and/or a voltage at two ends of the first diode D1. The first voltage is user-defined or system-defined, and is set to, for example, 500 volts (V). This is not limited in this application.

It should be noted that, the solution of improving the voltage withstand capability of the power conversion circuit by using the unidirectional conduction circuit in this application achieves a better effect when applied to a buck-boost topology circuit. That is, a lightning protection effect is better in the buck-boost topology circuit.

In some embodiments, the unidirectional conduction circuit is connected in parallel or magnetically coupled to the inductive element (which may be specifically an inductance coupling).

In some embodiments, the inductive element may further include/may be connected in series to another element, for example, a resistor. The unidirectional conduction circuit 100 is connected in parallel to or magnetically coupled two ends of the inductive element and the another element connected in series to the inductive element.

In some embodiments, the unidirectional conduction circuit 100 needs to meet the following features of forward current conduction and reverse current cutoff. The forward current is a current flowing from the power supply to the inductive element, or a current generated by the inductive element under excitation of the power supply. The reverse current is a current in a direction opposite to a direction of the forward current.

In some embodiments, the forward current is relative to the inductive element, that is, the unidirectional conduction circuit 100 supports forward current freewheeling/conduction of the inductive element and reverse current cutoff of the inductive element.

In some embodiments, the power conversion circuit may support working in a continuous mode in which a minimum current of an inductor is greater than 0, to avoid a prior-art problem of a magnetic loss and a copper loss caused to an inductive element when a minimum current of an inductor exceeds 0. The continuous mode in which the minimum current of the inductor is greater than 0 is specifically described in detail below.

In some embodiments, the unidirectional conduction circuit 100 may support working in a continuous mode of forward currents. A minimum current value of the forward current is greater than 0. For the forward current, reference may be made to the related description in the foregoing embodiment, and details are not described herein again.

In some embodiments, the unidirectional conduction circuit 100 may be configured as a low impedance circuit or a high impedance circuit based on an actual need, to implement on or off of the unidirectional conduction circuit. For example, the unidirectional conduction circuit 100 may be configured as a low impedance circuit under control of the controller 200, to turn on the unidirectional conduction circuit. The unidirectional conduction circuit 100 may be configured as a high impedance circuit under control of the controller 200, to turn off the unidirectional conduction circuit.

In some embodiments, the unidirectional conduction circuit may include any one or any combination of the following: a diode, a triode, a switch, a field effect transistor, a relay, or another component for implementing a high/low impedance circuit. For example, the unidirectional conduction circuit 100 includes a second diode D2 and a second switch element Q2 electrically connected to each other. The second diode supports unidirectional conduction, and specifically supports features of forward current conduction and reverse current cutoff. The controller 200 may control on/off of the second switch element Q2, and then control turning off or turning on of the unidirectional conduction circuit. Specifically, the second switch element is turned on under control of the controller. In this case, the unidirectional conduction circuit is configured (considered) as a low impedance circuit, and the unidirectional conduction circuit is turned on. The second switch element is turned off under control of the controller. In this case, the unidirectional conduction circuit is configured as a high impedance circuit, and the unidirectional conduction circuit is turned off and disconnected.

In this application, the high impedance circuit may be a circuit with a circuit impedance greater than or equal to a preset impedance. The preset impedance is user-defined or system-defined, and is set to, for example, 10 kOhm. The low impedance circuit may be a circuit with a circuit impedance less than the preset impedance, or may be a circuit with a circuit current equal to a maximum current flowing through the inductive element L1. In this case, a voltage at two ends of the circuit is less than or equal to a specified voltage (for example, 1 V).

In some embodiments, both the first switch element and the second switch element are configured to implement on/off of a circuit, and may specifically include, but are not limited to, a switch, a diode, a triode, a field effect transistor, a relay, and another component for implementing on/off of a circuit.

In some embodiments, the inductive element L1 may include, but is not limited to, a single inductor, a coupled inductor, a choke, a converter, or another related component for implementing an inductor function.

In some embodiments, the first diode D1 may be a body diode. For example, during actual application, the first diode may be a silicon MOS tube, or another device that includes a body diode/parasitic diode. This is not limited in this application.

In some embodiments, the power conversion circuit may be an isolated circuit or a non-isolated circuit. The isolated circuit is a circuit in which an input end is not electrically connected to an output end, energy may be transferred through magnetic coupling, and the input end and the output end are completely electrically isolated. The non-isolated circuit is a circuit in which an input end is electrically the same as an output end, without isolation.

In some embodiments, the power conversion circuit may include, but is not limited to, a buck buck topology circuit, a boost boost topology circuit, a buck-boost topology circuit, a forward topology circuit, a flyback topology circuit, and another topology circuit for power/voltage conversion.

Figure 3B:
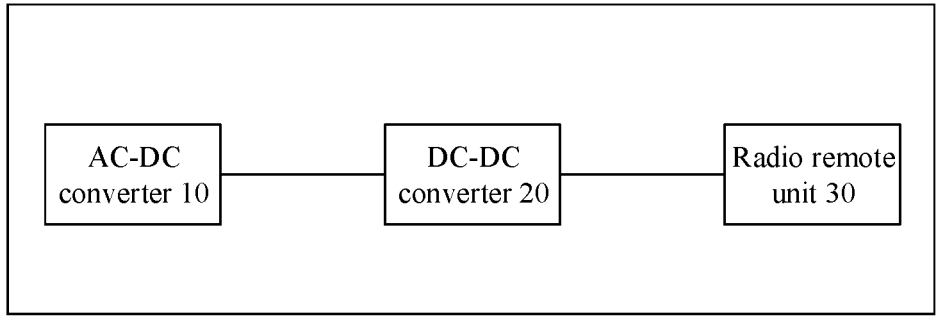
FIG. 3B is a schematic diagram of an application scenario according to an embodiment of the present disclosure.

FIG. 3B shows a possible application scenario of the power converter provided in this application. For example, the power conversion circuit may be applied to the power converter 300, and the power converter may also be referred to as a communication power supply, a DC-DC (direct current-direct current) power supply, a DC-DC converter, a DC-DC power distribution system, and the like. The power supply herein refers to an apparatus that converts another form of energy into electric energy. Particularly, when applied in a wireless communications system, the power converter 300 may supply power to a radio remote unit (RRU), and specifically, may supply power to a power amplifier or a point of load power supply of the RRU. Details are not described in this application. As shown in FIG. 3B, a current output by a power grid may first pass through an alternating current-direct current (AC-DC) converter 10, to convert an alternating current output by the power grid into a direct current. Then, a direct current-direct current (DC-DC) converter 20 (that is, the power converter 300 in this application) is used for power distribution for the power amplifier of the radio remote unit 30. That is, in a communication direct current power supply system, the DC-DC converter (the power converter 300) may be used for power distribution.

This embodiment of the present disclosure can be implemented to resolve a prior-art problem such as a large reverse recovery loss of a diode, a relatively high requirement on an element of a circuit, or damage to an element of a circuit caused by a relatively weak voltage withstand capability of the element when a lightning strike occurs.

For ease of understanding, related embodiments in this application are described in detail by mainly using examples in which the power conversion circuit is a buck-boost topology circuit, a buck topology circuit, a boost topology circuit, or the like.

First Embodiment: Buck-Boost Topology Circuit

Figure 4:
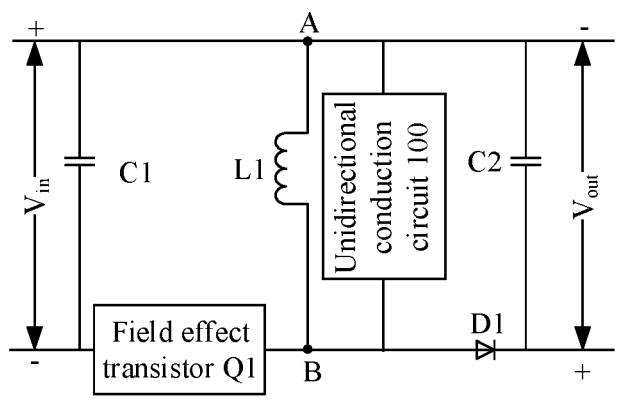
FIG. 4 is a schematic diagram of a buck-boost topology circuit according to an embodiment of the present disclosure.

FIG. 4 shows a buck-boost topology circuit. As shown in FIG. 4, for example, the first switch element is the field effect transistor Q1, and the inductive element is the inductor L1. The unidirectional conduction circuit 100 is connected in parallel to the inductor L1. The circuit further includes a first capacitor C1 and a second capacitor C2. In this embodiment, the unidirectional conduction circuit 100 may be configured as a low impedance circuit or a high impedance circuit alternatively, that is, the unidirectional conduction circuit 100 may support switching between on and off states, to implement a corresponding function. Specifically, when the unidirectional conduction circuit is configured as a low impedance circuit, the unidirectional conduction circuit may be turned on. If an impedance in the low impedance circuit is negligible, it may be considered that two ends of the inductor L1 are short-circuited, and all currents in the inductor L1 flow back to the inductor L1 through the low impedance circuit. There is no energy loss of the inductor. When the unidirectional conduction circuit is configured as a high impedance circuit, the unidirectional conduction circuit may be turned off. If an impedance in the high impedance circuit is relatively high, it may be considered that the high impedance circuit is open-circuited, and a current in the inductor L1 flows through the first switch element Q1 or the first diode D1, to provide a corresponding output voltage/output power for the load.

Figure 5A:
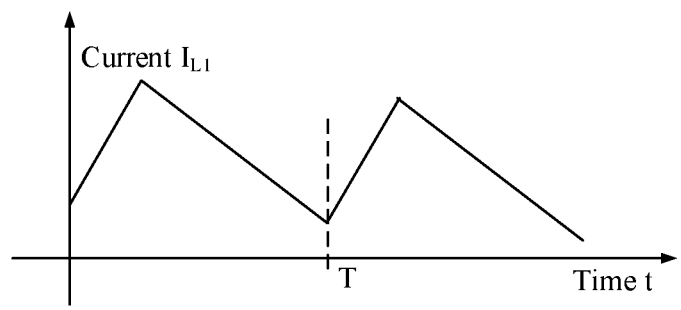
FIG. 5A and FIG. 5B are two schematic current diagrams of an inductor according to an embodiment of the present disclosure.
Figure 5B:
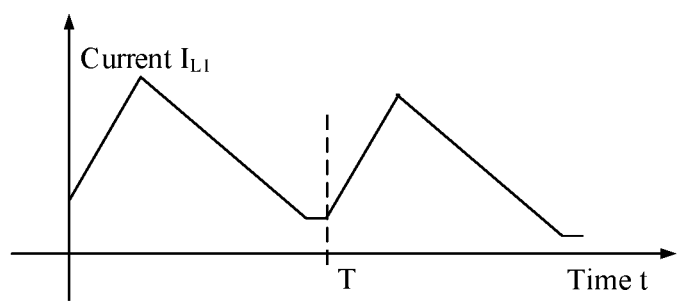

In some embodiments, the buck-boost topology circuit may work in a continuous mode in which a minimum current of the inductor is greater than 0. Specifically, FIG. 5A and FIG. 5B show two schematic current diagrams of the inductor L1 in the mode. Specifically, in a power conversion cycle T, Q1 is turned on, the input voltage Vin of the power supply charges the inductor L1, and the inductor L1 stores energy. After a particular period of time, Q1 is turned off, and the inductor L1 serves as the power supply, releases the energy, and provides an output voltage of Vout for the load.

To resolve a problem of a large reverse recovery loss of the diode D1, before the first switch element Q1 is turned on in the power conversion cycle T, the controller turns on the unidirectional conduction circuit. For example, the controller configures the unidirectional conduction circuit to work as a low impedance circuit, that is, the controller controls the unidirectional conduction circuit to work in a low impedance state, to turn on the unidirectional conduction circuit. In this case, the first switch element Q1 is turned off, and a current path of the inductor L1 in the figure is: a point A→the inductor L1→a point B→the unidirectional conduction circuit→the point A. In this example, a forward current is a current flowing from the point B to the point A through the unidirectional conduction circuit. Because the unidirectional conduction circuit 100 is turned on (or serves as a low impedance circuit) in this case, it may be considered that the unidirectional conduction circuit is short-circuited if an impedance in the circuit is not considered, that is, potentials at the points A and B are the same. In this case, the output voltage Vout is applied to two ends of D1, so that reverse recovery of D1 can be completed before Q1 is turned on, and the input voltage Vin is applied to two ends of Q1. Compared with the prior art, a voltage of Vin+Vout at the two ends of each of Q1 and D1 is reduced. Correspondingly, the reverse recovery loss of D1 is reduced.

Figure 5C:
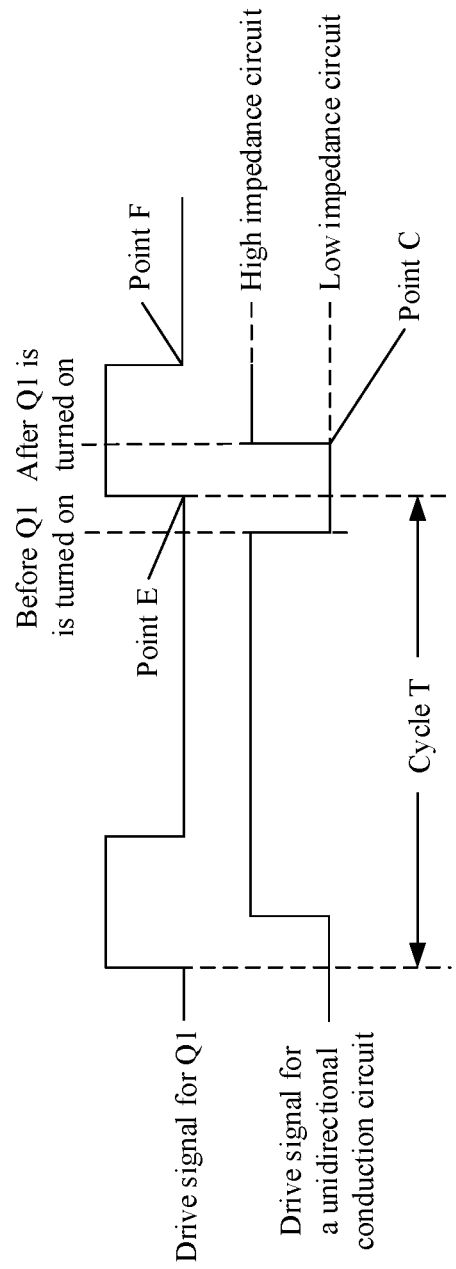
FIG. 5C to FIG. 5E are working sequence diagrams according to an embodiment of the present disclosure.

For example, the first switch element Q1 is an N-type field effect transistor, and FIG. 5C is a working sequence diagram showing that the controller controls the first switch element Q1 and the unidirectional conduction circuit 100. As shown in FIG. 5C, Q1 is turned on under control of a high level signal, and is turned off under control of a low level signal. Correspondingly, the unidirectional conduction circuit is turned off under control of a high level signal, that is, in this case, the unidirectional conduction circuit is configured as a high impedance circuit, and the circuit works in a high impedance state. The unidirectional conduction circuit is turned on under control of a low level signal, that is, in this case, the unidirectional conduction circuit is configured as a low impedance circuit, and the circuit works in a low impedance state.

It should be noted that, during actual application, a working sequence diagram showing controlling of the first switch element Q1 varies with different selected types (which are specifically selected elements and types of the elements) of the first switch element Q1. When Q1 is a field effect transistor, Q1 may include, but is not limited to, an N-type field effect transistor and a P-type field effect transistor. Correspondingly, a working sequence diagram showing controlling of the unidirectional conduction circuit may vary with different selected types of elements in the unidirectional conduction circuit and different circuit connection manners. This may be specifically determined based on an actual circuit diagram, and details are not described in this application. In this application, the high level signal and the low level signal are relative to each other, that is, a level value of the high level signal is greater than a level value of the low level signal. For example, in this application, the high level signal may be a signal with a level of 1, and the low level signal may be a signal with a level of 0. This is not described in detail in this application.

It may be understood that, with reference to FIG. 5A and FIG. 5B, before Q1 is turned on, the controller controls the unidirectional conduction circuit to be turned on, and for example, controls the unidirectional conduction circuit to work as a low impedance circuit. FIG. 5B is a schematic current diagram of the inductor L1 in this case. In FIG. 5B, a period of time in which a current remains unchanged in the power conversion cycle is a period of time from a time point at which the unidirectional conduction circuit is configured as a low impedance circuit before Q1 is turned on to a time point at which Q1 is turned on. That is, in FIG. 5B, a period of time in which a current remains unchanged in the power conversion cycle is a time point at which the unidirectional conduction circuit is turned on before Q1 is turned on to a time point at which Q1 is turned on. If an impedance in the low impedance circuit is considered, FIG. 5A is a schematic current diagram of the inductor L1 in this case.

In some embodiments, to ensure reliable working of the unidirectional conduction circuit, in a function conversion cycle, a time point at which the first switch element Q1 is turned on is used as a start time point of the power conversion cycle. After the first switch element Q1 is turned on and before the first switch element Q1 is turned on in a next power conversion cycle, the controller may control the unidirectional conduction circuit 100 to be turned off. For example, after Q1 is turned on and before Q1 is turned off, the controller may configure the unidirectional conduction circuit 100 as a high impedance circuit, that is, the controller controls the unidirectional conduction circuit to work as a high impedance circuit, to turn off the unidirectional conduction circuit. In addition, the high impedance circuit continues after Q1 is turned off in the current power conversion cycle and ends before Q1 is turned on in the next power conversion cycle. Specifically, as shown in FIG. 5C, a time point C at which the unidirectional conduction circuit is configured as a high impedance circuit needs to be after a point E and before a point F. That is, the time point C at which the unidirectional conduction circuit is turned off is after the point E and before the point F. The point E is a time point at which Q1 is turned on in the power conversion cycle. The point F is a time point at which Q1 is turned off in the power conversion cycle.

In some embodiments, the unidirectional conduction circuit supports forward current conduction and reverse current cutoff. Specifically, after Q1 is turned on, when the unidirectional conduction circuit is turned on (or still configured to work as a low impedance circuit), due to unidirectional conduction performance of the unidirectional conduction circuit, the power supply is not affected to store energy for the inductor L1, and the circuit works normally.

In some embodiments, problems such as a high requirement on a circuit element and a relatively weak voltage withstand capability of the circuit element when a lightning strike occurs may be resolved by configuring the unidirectional conduction circuit as a high impedance circuit or a low impedance circuit. Specifically, when the input voltage provided by the input power supply for the power converter is greater than or equal to the first voltage, the controller immediately turns off the first switch element Q1, and the controller further controls the unidirectional conduction circuit to be turned on. For example, the controller controls the unidirectional conduction circuit to work as a low impedance circuit, and the two ends of the inductor L1 are short-circuited if an impedance of the low impedance circuit is not considered. In this case, Q1 withstands an input voltage of Vin, and D1 withstands an output voltage of Vout. Compared with the prior art in which Q1 and D1 both withstand a voltage of Vout+Vin, an end voltage withstood by the two ends of each of Q1 and D1 is reduced, and a voltage withstand capability of a circuit element (which may be specifically Q1 and D1).

Figure 5D:
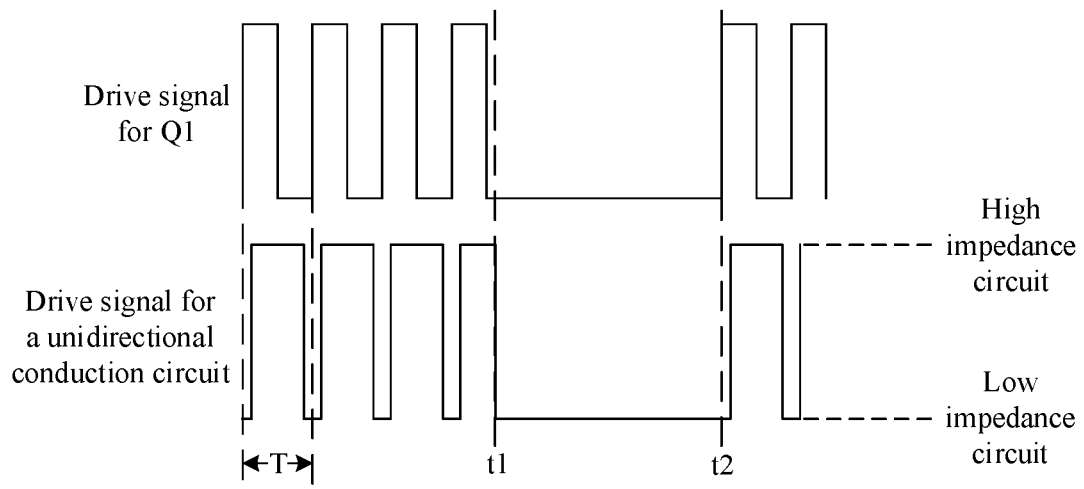

After the input voltage provided by the input power supply for the power converter is less than the first voltage (resumes normal), the power conversion circuit (which is a buck-boost circuit in this example) may resume controlling the input power of the power supply to be converted into the output power of the load based on a working principle of the power conversion cycle. For example, FIG. 5D is a working sequence diagram showing that the controller controls the power supply switch Q1 and the unidirectional conduction circuit 100. As shown in FIG. 5D, if a lightning strike occurs at t1, and the input voltage Vin of the input power supply is greater than that of a first power supply, Q1 is turned off, and the controller turns on the unidirectional conduction circuit under control of a low level signal, or configures, under control of a low level signal, the unidirectional conduction circuit to work as a low impedance circuit, to reduce an end voltage at the two ends of each of Q1 and D1, and protect the circuit elements Q1 and D1 against damage. At a moment t2, the input voltage Vin of the input power supply resumes normal. In this case, controller may resume a working sequence diagram in each previous power conversion cycle T, to effectively control on/off of Q1 and on/off of the unidirectional conduction circuit (or the unidirectional conduction circuit to work as a high impedance circuit or a low impedance circuit), thereby implementing better power conversion.

It should be noted that, to resolve the problems such as a relatively high requirement on a circuit element and a relatively weak voltage withstand capability of the circuit element when a lightning strike occurs, the unidirectional conduction circuit in the power conversion circuit (which is a buck-boost topology circuit in this example) may be a bidirectional conduction circuit, that is, a direction of a working current is not limited in the unidirectional conduction circuit, and the unidirectional conduction circuit can be turned on regardless of whether the working current is a forward current or a reverse current.

In some embodiments, the unidirectional conduction circuit includes at least one of the following elements: a diode, a switch, a triode, a field effect transistor, a relay, and another circuit element used for configurations switching between a high impedance circuit and a low impedance circuit. For example, the following shows three embodiments of the unidirectional conduction circuit.

Figure 6A:
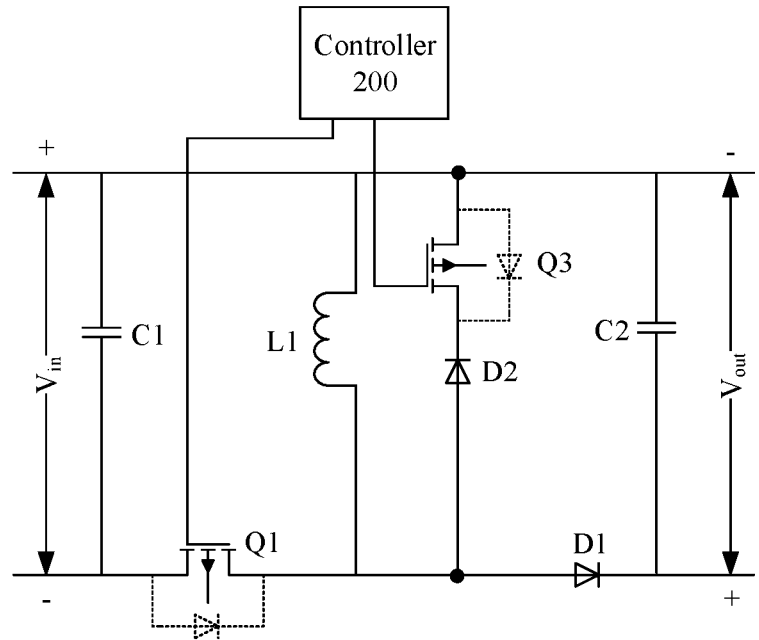
FIG. 6A to FIG. 6C are schematic diagrams of some other buck-boost topology circuits according to an embodiment of the present disclosure.

In a first implementation, FIG. 6A is a schematic diagram of a buck-boost topology circuit. As shown in FIG. 6A, the unidirectional conduction circuit includes a diode D2 and a field effect transistor Q3. A diode in Q3 is a body diode. Q1 and Q3 may control on/off of elements of Q1 and Q3 by using a controller. For a working sequence diagram showing that the controller controls Q1 and Q3, refer to FIG. 5C. In FIG. 5C, a working sequence diagram of the unidirectional conduction circuit is a working sequence diagram of Q3, and the figure shows that Q3 is turned on under control of a low level signal, and is turned off under control of a high level signal. In this case, for how to convert the input power (which may also be referred to as the input power of the input power supply in this application) provided by the input power supply for the power converter into the output power of the load by using the controller to control on/off of Q1 and Q3, and how to resolve the problems such as a large reverse loss of the diode D1 and a circuit element loss that easily occurs when a lightning strike occurs, reference may be made to related descriptions in the foregoing embodiment, and details are not described herein again.

During actual application, the field effect transistor Q3 in the unidirectional conduction circuit in FIG. 6A may alternatively be replaced with another element having a function of controlling on/off of a circuit, for example, a switch. A switch is used as an example. A working sequence diagram of the switch may alternatively be the working sequence diagram of the unidirectional conduction circuit in FIG. 5C, and the switch is turned on under control of a low level signal. In this case, the unidirectional conduction circuit is turned on, and the unidirectional conduction circuit is configured to work as a low impedance circuit. The switch is turned off under control of a high level. In this case, the unidirectional conduction circuit is turned off, and the unidirectional conduction circuit is configured to work as a high impedance circuit.

Figure 5E:
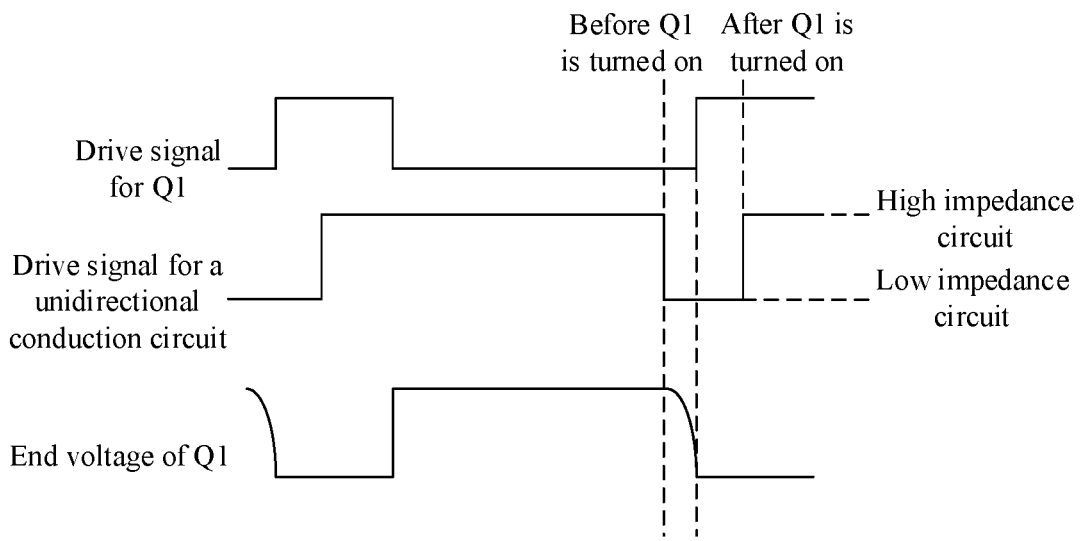
Figure 6B:
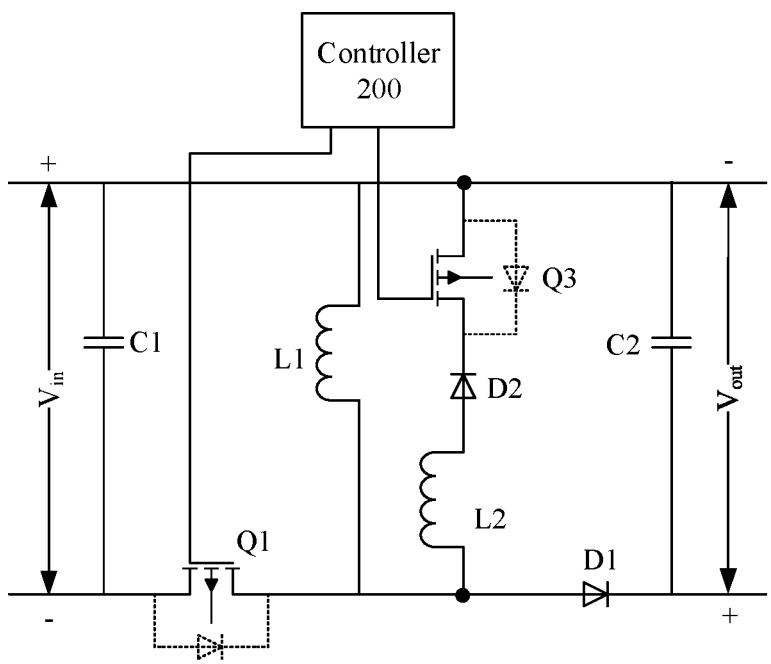

In a second implementation, FIG. 6B is a schematic diagram of another buck-boost topology circuit. As shown in FIG. 6B, the unidirectional conduction circuit includes a diode D2, a field effect transistor Q3, and an inductor L2. For how to control the field effect transistor Q3 and the first switch element Q1, refer to related descriptions in the foregoing embodiment. In this example, the inductor L2 is added, and L2 may be specifically a small inductor, for example, an inductor of several millihenries. When Q3 is turned on, L2 may resonate with a parasitic capacitor in Q1 or D1, so that a voltage at two ends of Q is reduced to 0 V, and then Q1 is turned on to implement zero voltage turn-on of Q1, thereby better resolving the problem of the reverse recovery loss of D1. Specifically, referring to FIG. 5E, before Q1 is turned on, the voltage at the two ends of Q1 may be reduced from Vin+Vout to 0 V through resonance, to implement zero voltage turn-on.

Figure 6C:
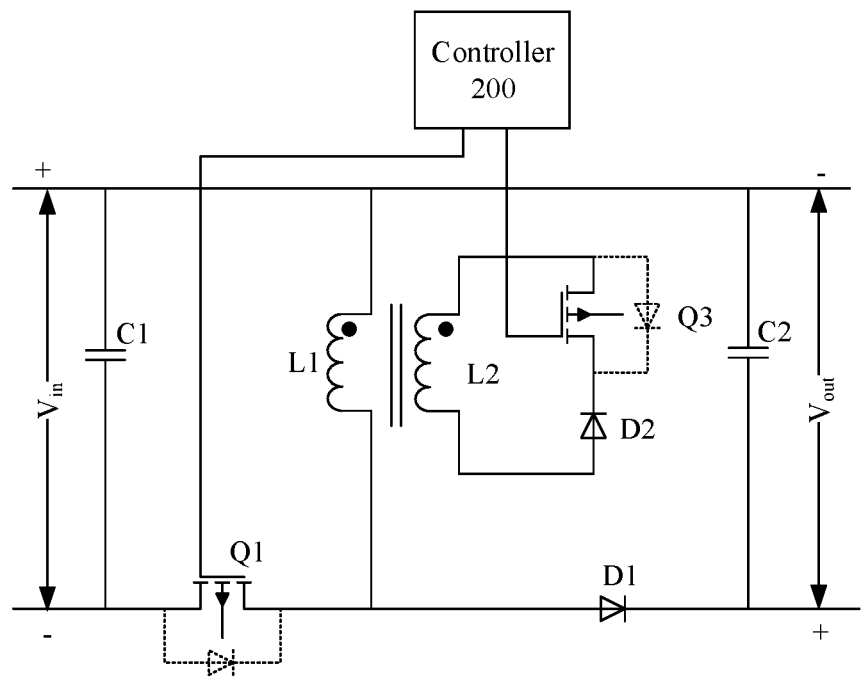

In a third implementation, FIG. 6C is a schematic diagram of another buck-boost topology circuit. As shown in FIG. 6C, the unidirectional conduction circuit includes a diode D2, a field effect transistor Q3, and a coupled inductor L2. In this example, the unidirectional conduction circuit is connected in parallel or magnetically coupled to the inductor L1, and L1 and L2 shown in the figure are completely magnetically coupled (inductively coupled) in a same direction. For how to control the field effect transistor Q3 and the first switch element Q1, refer to related descriptions in the foregoing embodiment. In this example, when Q3 is turned on, the two ends (that is, two ends A and B) of the inductor L1 are short-circuited through freewheeling of the inductor L2, and the voltage is reduced to 0, to achieve a same effect in the foregoing embodiment.

For content not shown or described in this embodiment of the present disclosure, reference may be made to related descriptions in the foregoing embodiment, and details are not described herein again.

Second Embodiment: Buck Topology Circuit

Figure 7:
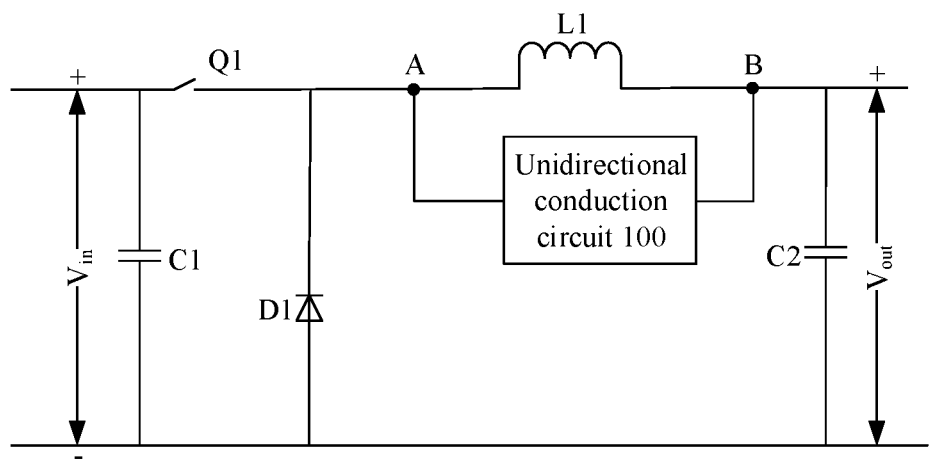
FIG. 7 is a schematic diagram of a buck topology circuit according to an embodiment of the present disclosure.

FIG. 7 shows a buck topology circuit. As shown in FIG. 7, for example, the first switch element is the switch Q1, and the inductive element is the inductor L1. The unidirectional conduction circuit 100 is connected in parallel to the inductor L1. Optionally, the circuit further includes a first capacitor C1 and a second capacitor C2. In this embodiment, the unidirectional conduction circuit 100 may also switch between on and off states based on an actual requirement, to implement a corresponding function. Specifically, to resolve the problem of the large reverse recovery loss of the diode D1, the controller may turn on the unidirectional conduction circuit before the first switch element Q1 is turned on in each power conversion cycle T, so that the reverse recovery for D1 is completed before Q1 is turned on. For example, the controller may configure the unidirectional conduction circuit to work as a low impedance circuit, to turn on the unidirectional conduction circuit. When the unidirectional conduction circuit is configured to work as a low impedance circuit, it may be considered that the two ends of the inductor L1 are short-circuited, and a current in L1 flows back to the inductor L1 through the low impedance circuit. In this case, a current path of the inductor L1 is: the point A→the inductor L1→the point B→the unidirectional conduction circuit→the point A. In addition, because the unidirectional conduction circuit 100 is turned on (or serves as a low impedance circuit) in this case, it may be considered that the unidirectional conduction circuit is short-circuited if an impedance in the circuit is not considered, that is, potentials at the points A and B are the same. In this case, the output voltage Vout is applied to two ends of D1, so that reverse recovery of D1 can be completed before Q1 is turned on. Compared with the prior art, the voltage Vin+Vout at the two ends of D1 is reduced, thereby reducing the reverse recovery loss of D1.

For a specific schematic circuit diagram of the unidirectional conduction circuit and how to use the controller to control the unidirectional conduction circuit and Q1 to work, correspondingly, refer to related descriptions in the foregoing embodiment. In addition, for parts not shown or described in this embodiment, reference may be made to related descriptions in the first embodiment, and details are not described herein again.

Third Embodiment: Boost Topology Circuit

Figure 8:
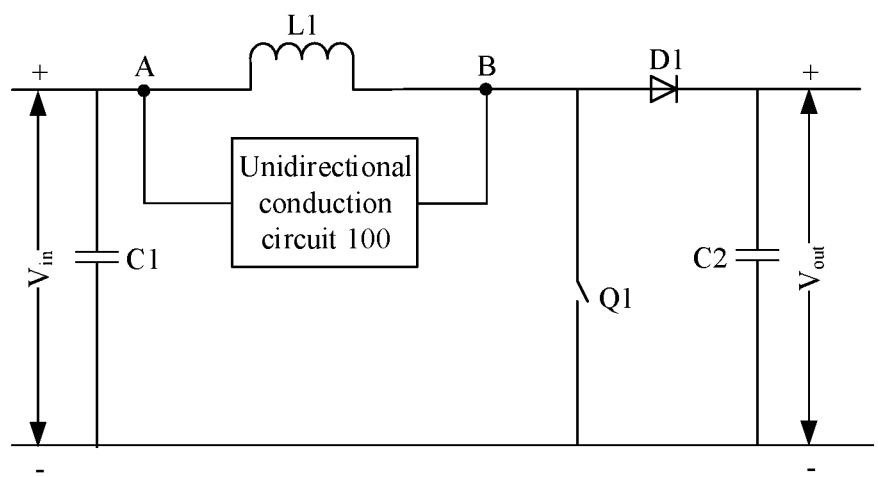
FIG. 8 is a schematic diagram of a boost topology circuit according to an embodiment of the present disclosure.

FIG. 8 shows a boost topology circuit. As shown in FIG. 8, for example, the first switch element is the switch Q1, and the inductive element is the inductor L1. The unidirectional conduction circuit 100 is connected in parallel to the inductor L1. Optionally, the circuit further includes a first capacitor C1 and a second capacitor C2. In this embodiment, the unidirectional conduction circuit 100 may also switch between on and off states based on an actual requirement, to implement a corresponding function. Specifically, when the unidirectional conduction circuit is turned on or configured to work as a low impedance circuit, it may be considered that the two ends of the inductor L1 are short-circuited, and a current in L1 flows back to the inductor L1 through the low impedance circuit. In this case, a current path of the inductor L1 is: the point A→the inductor L1→the point B→the unidirectional conduction circuit→the point A. Because the unidirectional conduction circuit 100 is turned on (or serves as a low impedance circuit) in this case, it may be considered that the unidirectional conduction circuit is short-circuited if an impedance in the circuit is not considered, that is, potentials at the points A and B are the same. In this case, the input voltage Vin is applied to two ends of Q1, and the output voltage Vout is applied to two ends of D1, so that reverse recovery of D1 can be completed before Q1 is turned on. Compared with the prior art, the voltage Vin+Vout at the two ends of each of Q1 and D1 is reduced, thereby reducing the reverse recovery loss of D1.

For a specific schematic circuit diagram of the unidirectional conduction circuit and how to use the controller to control the unidirectional conduction circuit and Q1 to work, correspondingly, refer to related descriptions in the foregoing embodiment. In addition, for parts not shown or described in this embodiment, reference may be made to related descriptions in the first embodiment, and details are not described herein again.

Fourth Embodiment: Forward Topology Circuit

Figure 9:
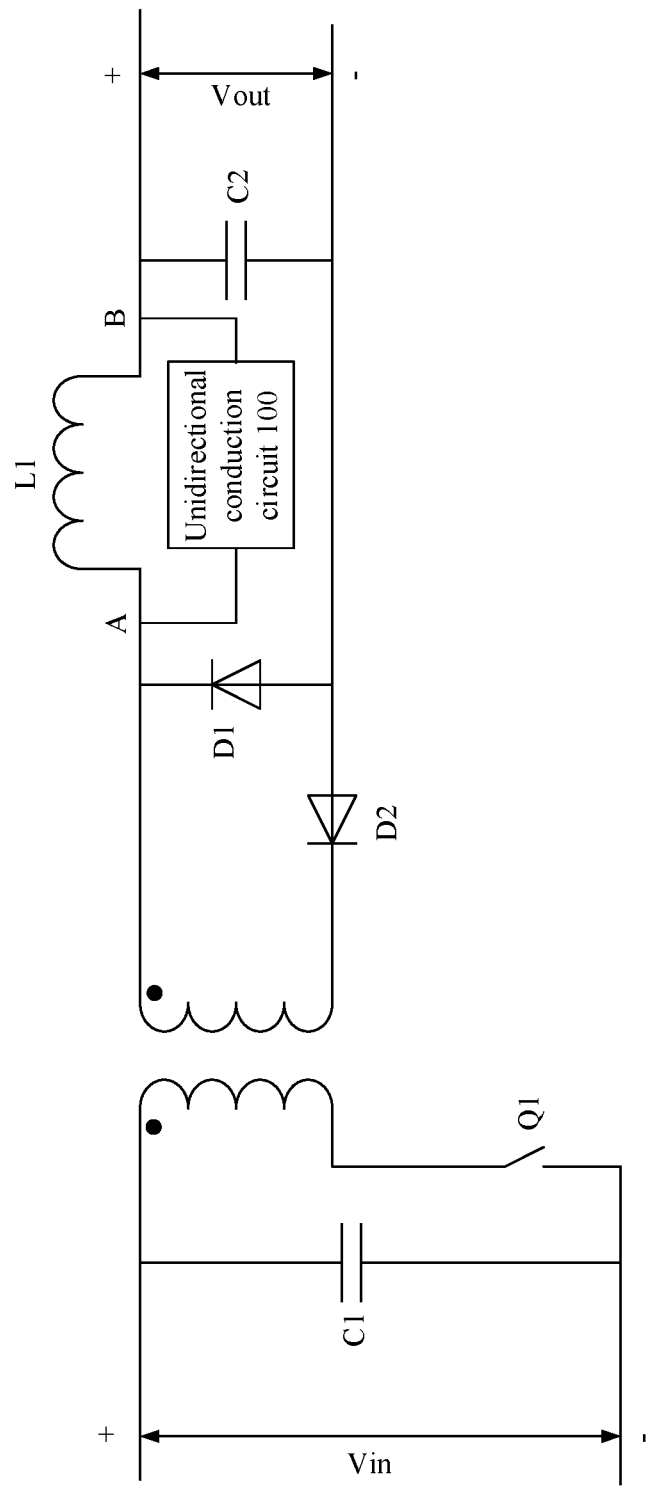
FIG. 9 is a schematic diagram of a forward topology circuit according to an embodiment of the present disclosure.

FIG. 9 shows a forward topology circuit. As shown in FIG. 9, for example, the first switch element is the switch Q1, and the inductive element is the inductor L1. The unidirectional conduction circuit 100 is connected in parallel to the inductor L1. Optionally, the circuit further includes a first capacitor C1, a second capacitor C2, and a diode D2. In this embodiment, the unidirectional conduction circuit 100 may also switch between on and off states based on an actual requirement, to implement a corresponding function. Specifically, when the controller controls the unidirectional conduction circuit to be turned on, for example, the controller controls the unidirectional conduction circuit to work as a low impedance circuit, to turn on the unidirectional conduction circuit. In this case, it may be considered that the two ends of the inductor L1 are short-circuited, and a current in L1 flows back to the inductor L1 through the low impedance circuit (which is specifically the unidirectional conduction circuit). In this case, a current path of the inductor L1 is: the point A→the inductor L1→the point B→the unidirectional conduction circuit→the point A. Because the unidirectional conduction circuit 100 is turned on (or serves as a low impedance circuit) in this case, it may be considered that the unidirectional conduction circuit is short-circuited if an impedance in the circuit is not considered, that is, potentials at the points A and B in the figure are the same. In this case, the input voltage Vin is applied to the two ends of Q1, and the output voltage Vout is applied to the two ends of D1, so that reverse recovery of D1 can be completed before Q1 is turned on. Compared with the prior art, the voltage Vin+Vout at the two ends of each of Q1 and D1 is reduced, thereby reducing the reverse recovery loss of D1.

For a specific schematic circuit diagram of the unidirectional conduction circuit and how to use the controller to control the unidirectional conduction circuit and Q1 to work, correspondingly, refer to related descriptions in the foregoing embodiment. In addition, for parts not shown or described in this embodiment, reference may be made to related descriptions in the first embodiment, and details are not described herein again.

Fifth Embodiment: Flyback Topology Circuit

Figure 10:
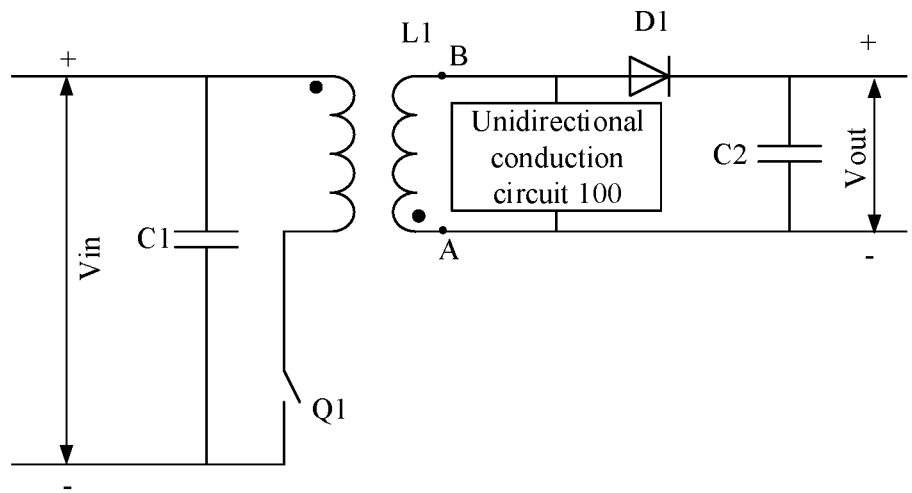
FIG. 10 is a schematic diagram of a flyback topology circuit according to an embodiment of the present disclosure.

FIG. 10 shows a flyback topology circuit. As shown in FIG. 10, for example, the first switch element is the switch Q1, and the inductive element is the inductor L1. The unidirectional conduction circuit 100 is connected in parallel to the inductor L1. The circuit further includes a first capacitor C1 and a second capacitor C2. In this embodiment, the unidirectional conduction circuit 100 may also switch between on and off states based on an actual requirement, to implement a corresponding function. Specifically, when the unidirectional conduction circuit is turned on or configured to work as a low impedance circuit, it may be considered that the unidirectional conduction circuit is short-circuited if an impedance in the circuit is not considered, that is, potentials at the points A and B in the figure are the same. In this case, the input voltage Vin is applied to the two ends of Q1, and the output voltage Vout is applied to the two ends of D1, so that reverse recovery of D1 can be completed before Q1 is turned on. Compared with the prior art, the voltage Vin+Vout at the two ends of each of Q1 and D1 is reduced, thereby reducing the reverse recovery loss of D1.

For a specific schematic circuit diagram of the unidirectional conduction circuit and how to use the controller to control the unidirectional conduction circuit and Q1 to work, correspondingly, refer to related descriptions in the foregoing embodiment. In addition, for parts not shown or described in this embodiment, reference may be made to related descriptions in the first embodiment, and details are not described herein again.

This embodiment of the present disclosure can be implemented to resolve a problem of a large reverse recovery loss of a diode in the prior art.

Figure 11:
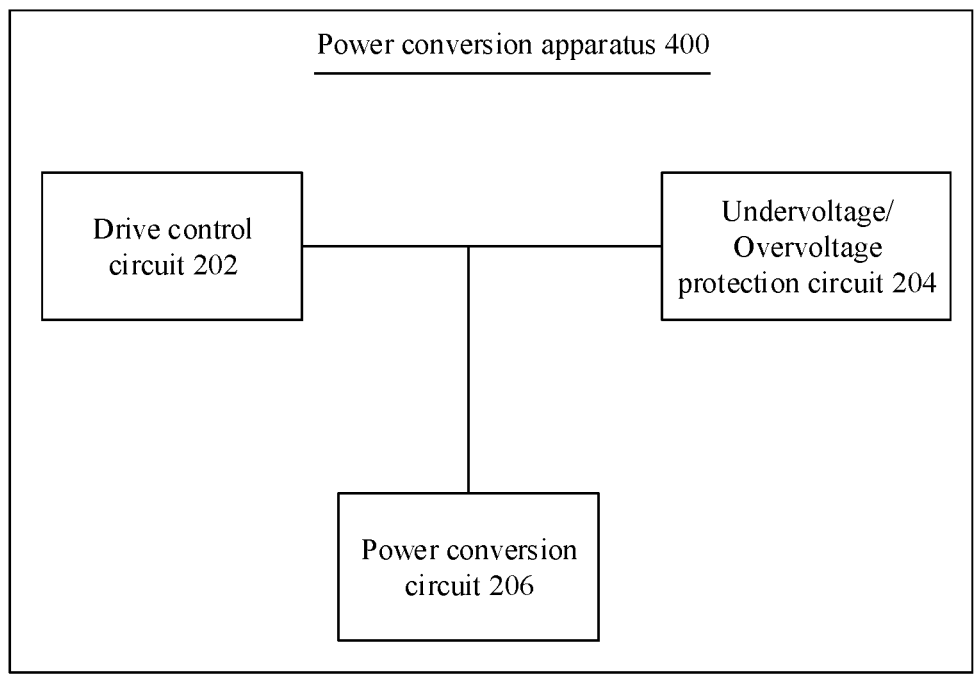
FIG. 11 is a schematic diagram of a power conversion apparatus according to an embodiment of the present disclosure.

Based on the foregoing embodiment, the following describes a power conversion apparatus and a related system in this application. FIG. 11 shows a power conversion apparatus 400 provided in an embodiment of the present disclosure. The power conversion apparatus shown in the figure is configured to convert an input power of an input power supply into an output power of a load. The power conversion apparatus includes a drive control circuit 202, an undervoltage/overvoltage protection circuit 204, and a power conversion circuit 206 that are connected to one another. The drive control circuit 202 is configured to control on/off of a switch element (for example, a first switch element) of the power conversion circuit, to implement power conversion of the power conversion circuit. The undervoltage/overvoltage protection circuit 204 is configured to: when overvoltage or undervoltage occurs in an input voltage of the input power supply, protect the power conversion apparatus by using the drive control circuit to control on/off of a switch element in the power conversion apparatus. Specifically, when the input voltage is greater than or equal to a first threshold, it may be determined that an overvoltage phenomenon/case occurs. When the input voltage is less than or equal to a second threshold, it may be determined that an undervoltage phenomenon/case occurs. The first threshold and the second threshold may be user-defined or system-defined. This is not limited in this application.

The drive control circuit 202 may be specifically the controller in the foregoing embodiment. The power conversion circuit 206 may be specifically the power conversion circuit in the foregoing embodiment. For details, reference may be made to related descriptions of conversion in the foregoing embodiment, and details are not described herein again.

Figure 12:
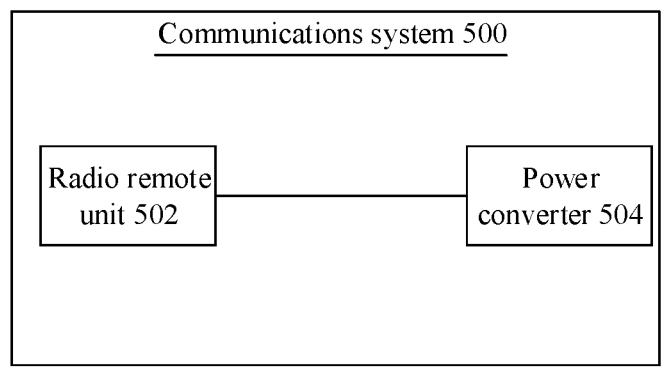
FIG. 12 is a schematic diagram of a communications system according to an embodiment of the present disclosure.

FIG. 12 shows a communications system 500 provided in an embodiment of the present disclosure. As shown in FIG. 12, the communications system 500 includes a radio remote unit RRU 502 and a power converter 504 supplying power to the radio remote unit RRU. The power converter may specifically supply power to a power amplifier of the RRU or a point of load power supply. This is not described in detail in this application. The power converter 504 includes a controller and a power conversion circuit, where the power conversion circuit is configured to convert an input power provided by an input power supply for the power converter into an output power of a load, the input power supply is an external power supply connected to the power converter, and the load is an output load connected to the power converter.

The power conversion circuit includes an inductive element, a first switch element, a first diode, and a unidirectional conduction circuit, where the inductive element is separately connected to the first switch element and the first diode, the unidirectional conduction circuit is connected in parallel to the inductive element, the controller is separately connected to the first switch element and the unidirectional conduction circuit, and the input power supply is connected to the inductive element through the first switch element.

The controller is configured to control on/off of the first switch element, to implement connection/disconnection between the input power supply and the inductive element, and convert, by using the inductive element, the input power provided by the input power supply for the power converter into the output power of the load.

The controller is further configured to control the unidirectional conduction circuit to be turned on before the first switch element is turned on in a preset power conversion cycle, so that a closed loop is formed between the unidirectional conduction circuit and the inductive element, to complete reverse recovery of the first diode before the first switch element is turned on, and reduce a reverse recovery loss of the first diode, where the power conversion cycle is duration between two adjacent time points at which the first switch element is turned off or duration between two adjacent time points at which the first switch element is turned on.

In some embodiments, the controller is further configured to control the unidirectional conduction circuit to be turned off after the first switch element is turned on in the power conversion cycle and before the first switch element is turned off in the power conversion cycle, so that the inductive element converts an input power of the input power supply into the output power of the load without having the input power consumed by the unidirectional conduction circuit.

In some embodiments, the power conversion circuit is a buck-boost topology circuit; and
the controller is further configured to: when an input voltage provided by the input power supply for the power converter is greater than or equal to a first voltage, control the first switch element to be turned off, and turn on the unidirectional conduction circuit, so that a closed loop is formed between the unidirectional conduction circuit and the inductive element, an end voltage is reduced, and a voltage withstand capability of the power conversion circuit is improved, wherein the end voltage is a voltage at two ends of the switch element, and/or a voltage at two ends of the first diode.

In some embodiments, the unidirectional conduction circuit is connected in parallel or magnetically coupled to the inductive element.

In some embodiments, the controller is further configured to control the unidirectional conduction circuit to be a low impedance circuit, to turn on the unidirectional conduction circuit; or control the unidirectional conduction circuit to be a high impedance circuit, to turn off the unidirectional conduction circuit.

In some embodiments, the unidirectional conduction circuit supports forward current conduction and reverse current cutoff, where the forward current is a current generated by the inductive element under excitation of the input power supply, and the reverse current is a current in a direction opposite to a direction of the forward current.

In some embodiments, the power conversion circuit supports working in a continuous mode, and a minimum current flowing through the inductive element is greater than 0.

In some embodiments, the unidirectional conduction circuit includes a second switch element and a second diode connected to each other; and the controller is configured to control on/off of the second switch element, to correspondingly control the unidirectional conduction circuit to be turned off or turned on.

In some embodiments, the second switch element includes any one of the following: a switch, a triode, a field effect transistor, a relay, and a diode.

In some embodiments, the power conversion circuit includes any one of the following: a buck buck topology circuit, a boost boost topology circuit, a buck-boost topology circuit, a forward topology circuit, a flyback topology circuit, an isolated topology circuit, and a non-isolated topology circuit.

In some embodiments, the first switch element includes any one of the following: a switch, a triode, a field effect transistor, a relay, and a diode.

In some embodiments, the power converter may be alternatively a power module, another power conversion apparatus, a power supply apparatus, or the like. This is not limited in this application. During actual application, the power conversion apparatus may be a high-power power supply (a power provided by the high-power power supply is greater than or equal to a preset power), for example, a BMP power supply. The power supply herein refers to an apparatus that converts another form of energy into electric energy.

For parts not shown or described in this embodiment of the present disclosure, reference may be made to related descriptions in the foregoing embodiment of the power conversion circuit, and details are not described herein again.

The elements of the circuit in the embodiments of the present disclosure may be rearranged, combined, and deleted based on actual needs. The circuit in the embodiments of the present disclosure may be implemented by using a universal integrated circuit, such as a CPU (Central Processing Unit), or by using an ASIC (Application Specific Integrated Circuit), or the like.

What is disclosed above is merely example embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A power converter, comprising a controller and a power conversion circuit, wherein the power conversion circuit is configured to convert an input power provided by an input power supply for the power converter into an output power of a load, the input power supply is an external power supply connected to the power converter, and the load is an output load connected to the power converter;

the power conversion circuit comprises an inductive element, a first switch element, a first diode, and a unidirectional conduction circuit, wherein the inductive element is separately connected to the first switch element and the first diode, the unidirectional conduction circuit is connected in parallel to the inductive element, the controller is separately connected to the first switch element and the unidirectional conduction circuit, and the input power supply is connected to the inductive element through the first switch element;

the controller is configured to control turning on and turning off of the first switch element, to implement connection and disconnection between the input power supply and the inductive element; and the controller is further configured to control the unidirectional conduction circuit to be turned on before the first switch element is turned on in a preset power conversion cycle, so that a closed loop is formed between the unidirectional conduction circuit and the inductive element, wherein the preset power conversion cycle is a duration between two adjacent time points at which the first switch element is turned off or a duration between two adjacent time points at which the first switch element is turned on.

2. The power converter according to claim 1, wherein the controller is further configured to control the unidirectional conduction circuit to be turned off after the first switch element is turned on in the preset power conversion cycle and before the first switch element is turned off in the preset power conversion cycle, so that the inductive element converts the input power of the input power supply into the output power of the load without having the input power consumed by the unidirectional conduction circuit.

3. The power converter according to claim 1, wherein the power conversion circuit is a buck-boost topology circuit; and the controller is further configured to: when an input voltage provided by the input power supply for the power converter is greater than or equal to a first voltage, control the first switch element to be turned off, and turn on the unidirectional conduction circuit, so that a closed loop is formed between the unidirectional conduction circuit and the inductive element, an end voltage is reduced, and a voltage withstand capability of the power conversion circuit is improved, wherein the end voltage is one or both of a voltage at two ends of the switch element, and a voltage at two ends of the first diode.

4. The power converter according to claim 1, wherein the unidirectional conduction circuit is connected in parallel or magnetically coupled to the inductive element.

5. The power converter according to claim 1, wherein the controller is further configured to control the unidirectional conduction circuit to be a low impedance circuit, to turn on the unidirectional conduction circuit; or control the unidirectional conduction circuit to be a high impedance circuit, to turn off the unidirectional conduction circuit.

6. The power converter according to claim 1, wherein the unidirectional conduction circuit supports forward current conduction and reverse current cutoff, wherein the forward current is a current generated by the inductive element under excitation of the input power supply, and the reverse current is a current in a direction opposite to a direction of the forward current.

7. The power converter according to claim 1, wherein the power conversion circuit supports working in a continuous mode, and a minimum current flowing through the inductive element is greater than 0.

8. The power converter according to claim 1, wherein the unidirectional conduction circuit comprises a second switch element and a second diode connected to each other; and
the controller is configured to control turning on and turning off of the second switch element, to correspondingly control the unidirectional conduction circuit to be turned off or turned on.

9. The power converter according to claim 8, wherein the second switch element comprises any one of the following: a switch, a triode, a field effect transistor, a relay, and a diode.

10. The power converter according to claim 1, wherein the power conversion circuit comprises any one of the following: a buck topology circuit, a boost topology circuit, a buck-boost topology circuit, a forward topology circuit, a flyback topology circuit, an isolated topology circuit, and a non-isolated topology circuit.

11. The power converter according to claim 1, wherein the first switch element comprises any one of the following: a switch, a triode, a field effect transistor, a relay, and a diode.

12. A communications system, comprising a radio remote unit (RRU) and a power converter supplying power to the RRU, wherein
wherein the power converter is configured to convert an input power provided by an input power supply for the power converter into an output power of a load, the input power supply is an external power supply connected to the power converter, and the load is an output load connected to the power converter;
the power conversion circuit comprises an inductive element, a first switch element, a first diode, and a unidirectional conduction circuit, wherein the inductive element is separately connected to the first switch element and the first diode, the unidirectional conduction circuit is connected in parallel to the inductive element, the controller is separately connected to the first switch element and the unidirectional conduction circuit, and the input power supply is connected to the inductive element through the first switch element;
the controller is configured to control turning on and turning off of the first switch element, to implement connection and disconnection between the input power supply and the inductive element, and convert, by using the inductive element, the input power provided by the input power supply for the power converter into the output power of the load; and
the controller is further configured to control the unidirectional conduction circuit to be turned on before the first switch element is turned on in a preset power conversion cycle, so that a closed loop is formed between the unidirectional conduction circuit and the inductive element, to complete reverse recovery of the first diode before the first switch element is turned on, and reduce a reverse recovery loss of the first diode, wherein the power preset conversion cycle is a duration between two adjacent time points at which the first switch element is turned off or a duration between two adjacent time points at which the first switch element is turned on.

13. The communications system according to claim 12, wherein
the controller is further configured to control the unidirectional conduction circuit to be turned off after the first switch element is turned on in the preset power conversion cycle and before the first switch element is turned off in the preset power conversion cycle, so that the inductive element converts the input power of the input power supply into the output power of the load without having the input power consumed by the unidirectional conduction circuit.

14. The communications system according to claim 12, wherein the power conversion circuit is a buck-boost topology circuit; and
the controller is further configured to: when an input voltage provided by the input power supply for the power converter is greater than or equal to a first voltage, control the first switch element to be turned off, and turn on the unidirectional conduction circuit, so that a closed loop is formed between the unidirectional conduction circuit and the inductive element, an end voltage is reduced, and a voltage withstand capability of the power conversion circuit is improved, wherein the end voltage is one or both of a voltage at two ends of the switch element, and a voltage at two ends of the first diode.

* * * * *